(12) United States Patent
Taniguchi (10) Patent No.: US 7,128,550 B2
(45) Date of Patent: Oct. 31, 2006

(54) INJECTION MOLDING MACHINE (75) Inventor: Yoshiya Taniguchi, Kako-gun (JP)

(73) Assignee: Toyo Machinery & Metal Co., Ltd., Akashi (JP)

( * ) Notice: Subject to any disclaimer, the term of this patent is extended or adjusted under 35 U.S.C. 154(b) by 34 days.

(21) Appl. No.: 10/261,624

(22) Filed: Oct. 2, 2002

(65) Prior Publication Data

US 2003/0068396 A1    Apr. 10, 2003

(30) Foreign Application Priority Data

Oct. 5, 2001    (JP)    ............................. 2001-310305
Sep. 5, 2002    (JP)    ............................. 2002-260218

(51) Int. Cl.
*B29D 11/00*    (2006.01)
(52) U.S. Cl. ...................... 425/144; 425/145; 425/588; 425/810
(58) Field of Classification Search ................ 425/572, 425/588, 436 R, 810, 135, 143, 144, 145; 264/328.8
See application file for complete search history.

(56) References Cited

U.S. PATENT DOCUMENTS 4,634,366 A * 1/1987 Brun et al. .................. 425/526
4,726,751 A * 2/1988 Shibata et al. ............... 425/144
5,736,169 A * 4/1998 Brams et al. ............. 425/450.1
5,849,344 A * 12/1998 Eto et al. ..................... 425/556
6,051,896 A * 4/2000 Shibuya et al. ............... 310/12

FOREIGN PATENT DOCUMENTS

DE          4239776 A1 *  6/1994
EP          1100080 A2 *  5/2001
JP        2001232666 A  *  8/2001

OTHER PUBLICATIONS

Computer translation of JP 2001-232666.*
English Abstract for DE 42 39 776.*

* cited by examiner

*Primary Examiner*—Donald Heckenberg
(74) *Attorney, Agent, or Firm*—Crowell & Moring LLP (57) ABSTRACT

An injection molding machine using a two-disk forming mold, in which two disk substrates molded simultaneously are made uniform without unbalance in weight. The injection molding machine uses a two-disk forming mold. The mold includes two disk molding cavities independent of each other, and resin inlets provided correspondingly to the cavities respectively. In the injection molding machine, molten resin is simultaneously injected and charged into the two cavities respectively by two plasticizing/injecting units independent of each other. The operations of the two plasticizing/injecting units are controlled to make the molten resin uniform to be charged into the two cavities.

3 Claims, 9 Drawing Sheets

INJECTION MOLDING MACHINE

FIELD OF THE INVENTION

The present invention relates to an injection molding machine using a two-disk forming mold for molding two disk substrates for an optical disk simultaneously at one shot.

DESCRIPTION OF THE RELATED ART

Disk substrates for optical disks are typically produced by molding one by one at each shot. Recently, however, there is a case that two disk substrates are molded simultaneously at each shot in order to improve the productivity.

Figure 10:
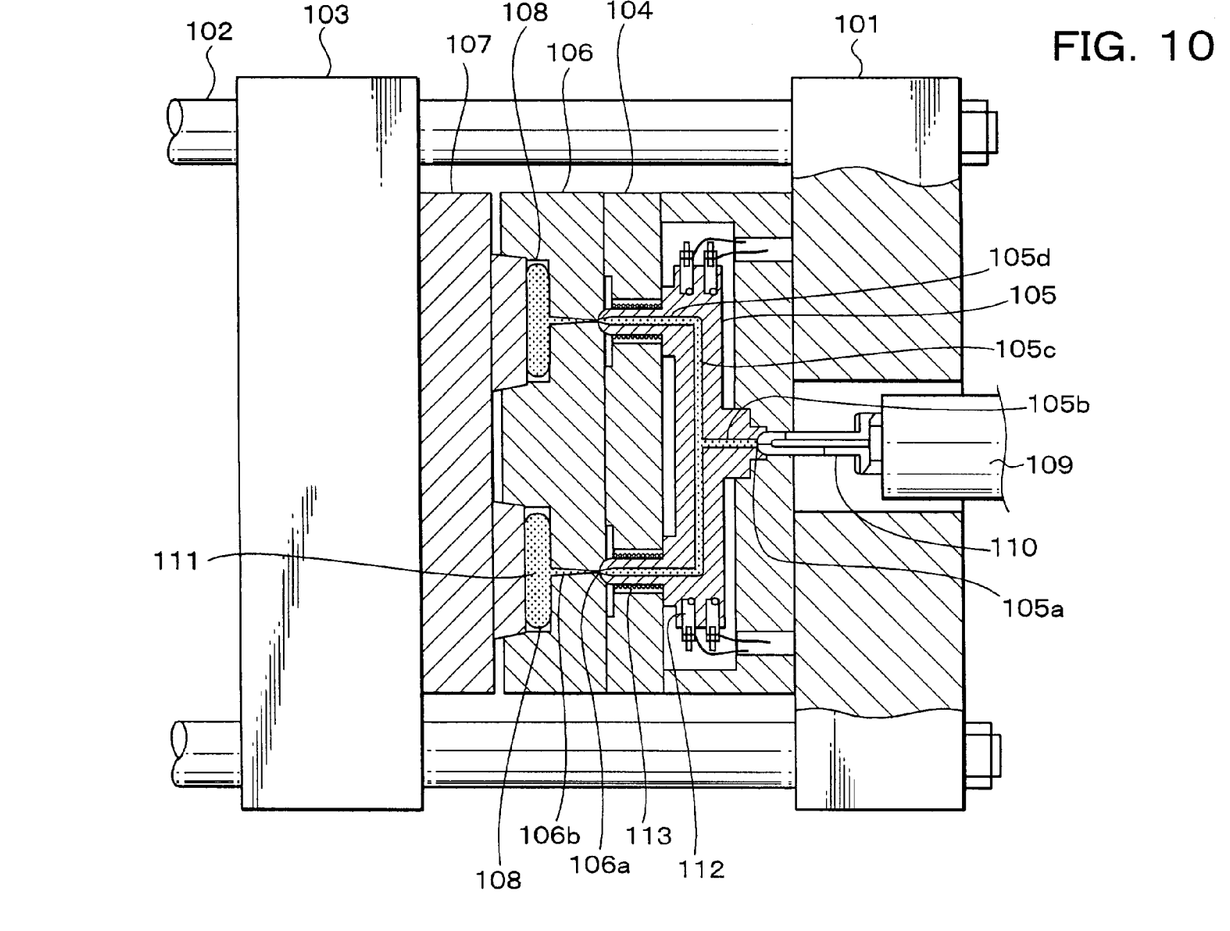
FIG. 10 is a main portion sectional plan view of a related-art injection molding machine using a two-disk forming mold.

FIG. 10 is a main portion sectional view of a related-art injection molding machine using a two-disk forming mold. In FIG. 10, the reference numeral 101 represents a fixed die plate; 102, a tie bar laid between the fixed die plate 101 and a not-shown mold opening/closing drive source support plate; 103, a movable die plate into which the tie bar 102 is inserted so that the movable die plate 103 is guided by the tie bar 102 and which is driven to move forward/backward by the force of the not-shown mold opening/closing drive source; 104, a fixed mold attached to the fixed die plate 101; 105, a hot runner mold portion forming a part of the fixed mold 104; 106, a cavity forming mold portion forming apart of the fixed mold 104; 107, a movable mold attached to the movable die plate 103; 108 and 108, cavities which are spaces for forming disk substrates and which are formed by the movable mold 107 and the fixed mold 104 (here the cavity forming mold portion 106) at the time of mold closing; 109, a heating cylinder including a not-shown screw rotatable and movable forward/backward; and 110, a nozzle attached to the forward end of the heating cylinder 109 and pressed onto a resin inlet (here a resin inlet 105a of the hot runner mold portion 105) of the fixed mold 104.

A resin inlet 105a, a first sprue 105b, two runners 105c and 105c, and two second sprues 105d and 105d are formed in the hot runner mold portion 105. Resin 111 from the nozzle 110 is injected into the resin inlet 105a. The first sprue 105b communicates with the resin inlet 105a. The first sprue 105b branches into the two runners 105c and 105c. The runners 105c and 105c communicate with the first sprue 105b. The second sprues 105d and 105d communicate with the runners 105c and 105c respectively. The portions of the hot runner portion 105 where the second sprues 105d are provided are shaped like nozzles respectively. The forward ends of the nozzle-like portions are pressed onto resin inlets 106a and 106a of the cavity forming mold portion 106 respectively. Thus, the resin 111 injected from each resin inlet 106a is introduced into the cavity 108 through a sprue 106b of the cavity forming mold portion 106.

Incidentally, a bar-like heater 112 is built in the main body portion of the hot runner mold portion 105 while a heater 113 is wound on each of the nozzle-like portions of the hot runner mold portion 105. Thus, the temperature of each portion of the hot runner mold portion 105 is controlled to be a predetermined temperature.

In the configuration shown in FIG. 10, with the forward movement of the not-shown screw in the heating cylinder 109, the resin (molten resin) 111 injected from the nozzle 110 into the fixed mold 104 passes through resin flow paths of the hot runner mold portion 105 and the cavity forming mold portion 106 so as to be injected and charged into the two cavities 108 simultaneously. Thus, two disk substrates are molded at one shot.

Such an injection molding machine arranged similarly to the configuration of FIG. 10 for molding two disk substrates is disclosed in Japanese Patent Laid-Open No. 155986/1997. In "Laminated disk manufacturing apparatus" disclosed in this laid-open official gazette, two disk substrates molded at each shot are paired and laminated after reflective layers and protective layers are formed thereon. Thus, a laminated optical disk is obtained. When the configuration of such a disk manufacturing system is adopted, there is an advantage that the start-up efficiency of molding operation is improved greatly in comparison with the case where one disk substrate is molded at each shot by each of two injection molding machines and the disk substrates obtained thus are put into a laminated optical disk manufacturing line.

In the configuration shown in FIG. 10, however, the resin flow path branches from the first sprue 105b of the hot runner mold portion 105 into first and second resin flow path systems for the two cavities (two disk substrates). The first and second resin flow path systems have an unavoidable error in manufacturing so that the first and second resin flow path systems cannot be made perfectly equal to each other mechanically. Thus, there occurs a difference in weight between the two disk substrates molded simultaneously at one shot.

Figure 11:
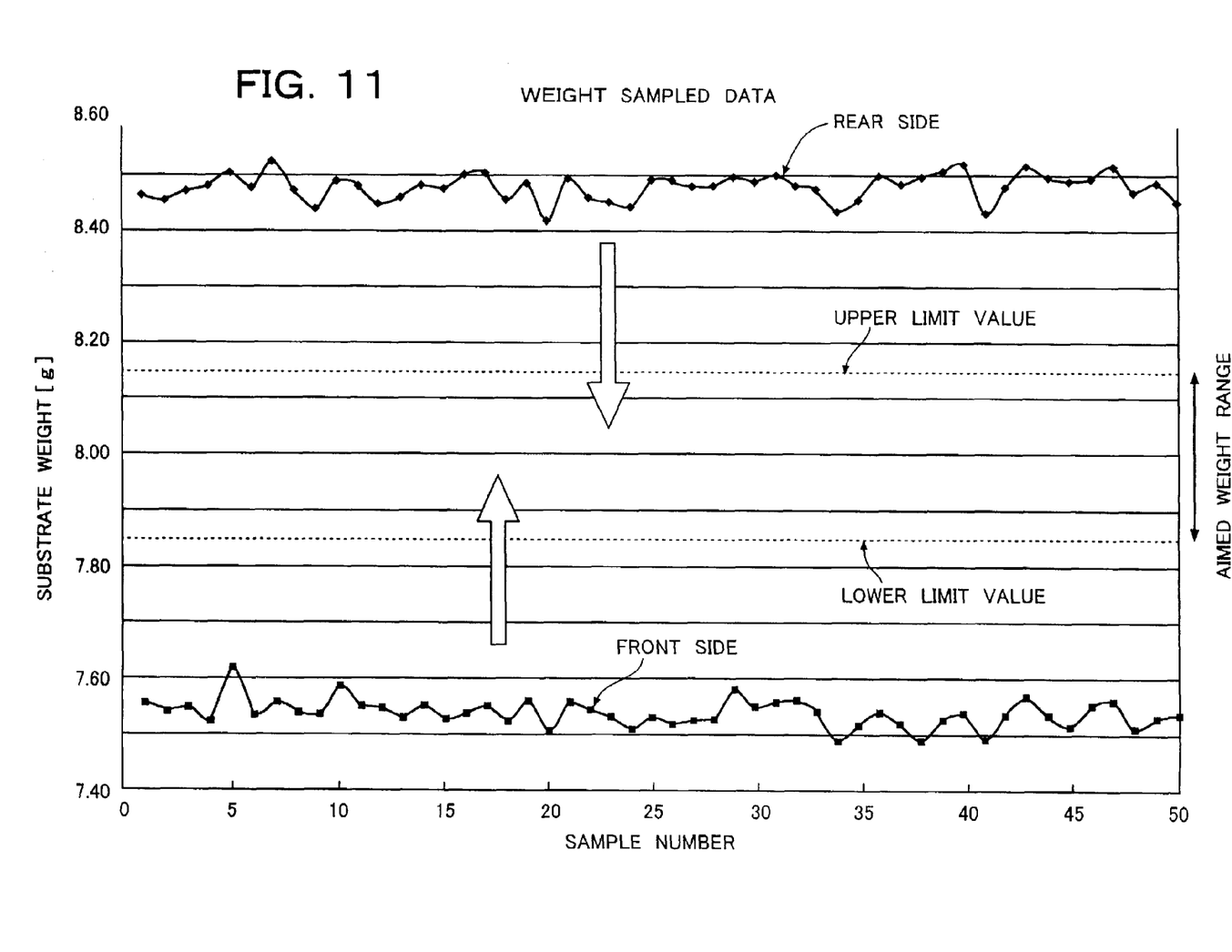
FIG. 11 is an explanatory view showing an example of sampled data of weight in disk substrates molded respectively in a front cavity and a rear cavity when first and second resin flow path systems were controlled in temperature under totally the same conditions in the configuration shown in FIG. 10.

FIG. 11 shows an example of sampled data of weight in disk substrates molded respectively in a front cavity and a rear cavity when the first and second resin flow path systems were controlled in temperature under totally the same conditions in the configuration shown in FIG. 10. As is apparent from FIG. 11, there occurs a different in weight between the front side and the rear side, and the weight is out of an aimed weight range on both the front side and the rear side (incidentally, the sampled data in FIG. 11 includes a machine error peculiar to the machine).

Therefore, control is made with a slight difference in temperature control conditions between the first resin flow path system and the second resin flow path system so as to bring a slight difference in resin temperature (in other words, resin viscosity) between the first resin flow path system and the second resin flow path system. Thus, adjustment is made so that the weights of the disk substrates on the front side and the rear side are in the aimed weight range.

In the related art, as described above, control is made with a slight difference in temperature control conditions between the first resin flow path system for one disk substrate and the second resin flow path system for the other disk substrate in order to adjust the difference in weight between the two disk substrates caused by the unavoidable slight unbalance in manufacturing between the first resin flow path system and the second resin f low path system. However, even if the temperature control is made by PID (Proportional Integral Differential) feedback control, there is a certain limit in making the two simultaneously molded disk substrates as uniform as possible. In addition, from the point of view to make the two disk substrates uniform in optical performance, it is not preferable to make control with a difference in temperature control conditions between the first resin flow path system and the second resin flow path system.

Incidentally, there is also known an injection molding machine for molding two disk substrates, in which a hot runner mold is omitted while the forward end of one heating cylinder is formed into a Y-shape, and nozzles are attached to the forward bifurcated ends of the Y-shape respectively so as to inject and charge resin into independent cavities from the nozzles respectively. Also in this case, an unavoidable slight unbalance in manufacturing occurs between the first resin flow path system for one disk substrate and the second resin flow path system for the other disk substrate. In order to adjust the difference in weight between the two disk substrates caused by the unbalance, control is made with a slight difference in temperature control conditions between the first resin flow path system and the second resin flow path system. Thus, the aforementioned problem occurs in the same manner.

Further, in the related-art technique shown in FIG. 10, the resin injected from the nozzle 110 is charged into the cavities 108 via the hot runner mold portion 105. Therefore, when continuously molding operation is once suspended and then restarted, all the resin stayed in the resin flow paths of the hot runner mold portion 105 has to be extruded and replaced by fresh resin. Thus, the troublesomeness of preliminary work before the beginning of molding is also pointed out.

SUMMARY OF THE INVENTION

The present invention was developed in consideration of the foregoing problems. It is an object of the present invention to provide an injection molding machine using a two-disk forming mold, in which two disk substrates molded simultaneously are made uniform without unbalance in weight.

In order to attain the foregoing object, an injection molding machine according to the present invention uses a two-disk forming mold. The mold includes two disk molding cavities independent of each other, and resin inlets provided correspondingly to the cavities respectively. In the injection molding machine, molten resin is injected and charged into the two cavities respectively by two plasticizing/injecting units independent of each other. The operations of the two plasticizing/injecting units are controlled to make the molten resin uniform to be charged into the two cavities.

BRIEF DESCRIPTION OF THE DRAWINGS

These and other features, objects and advantages of the present invention will become more apparent from the following description when taken in conjunction with the accompanying drawings wherein.

DESCRIPTION OF THE PREFERRED EMBODIMENT

An embodiment of the present invention will be described below with reference to the drawings.

Figure 1:
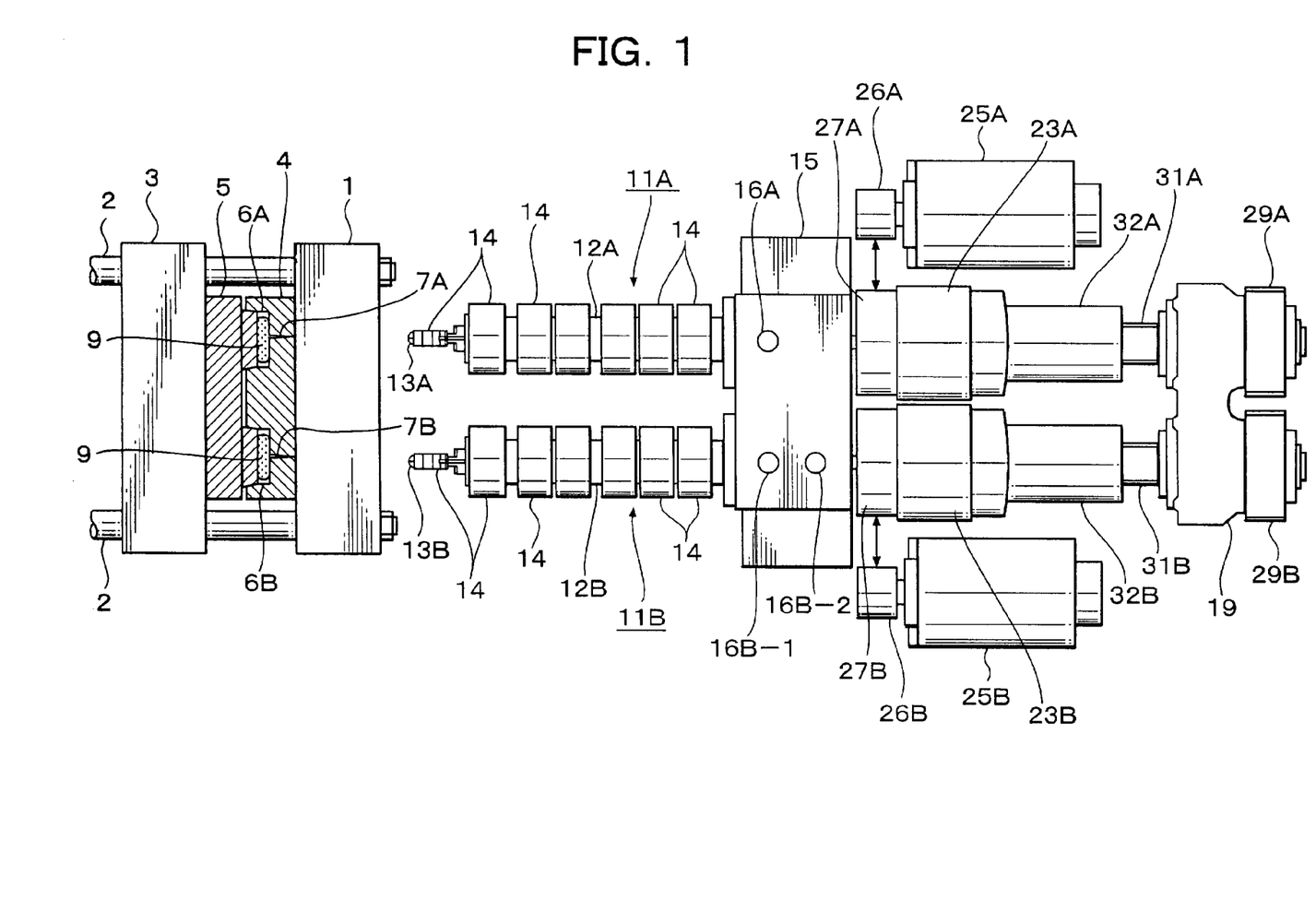
FIG. 1 is a main portion plan view showing chiefly an injection mechanism system of an injection molding machine according to an embodiment of the present invention.
Figure 2:
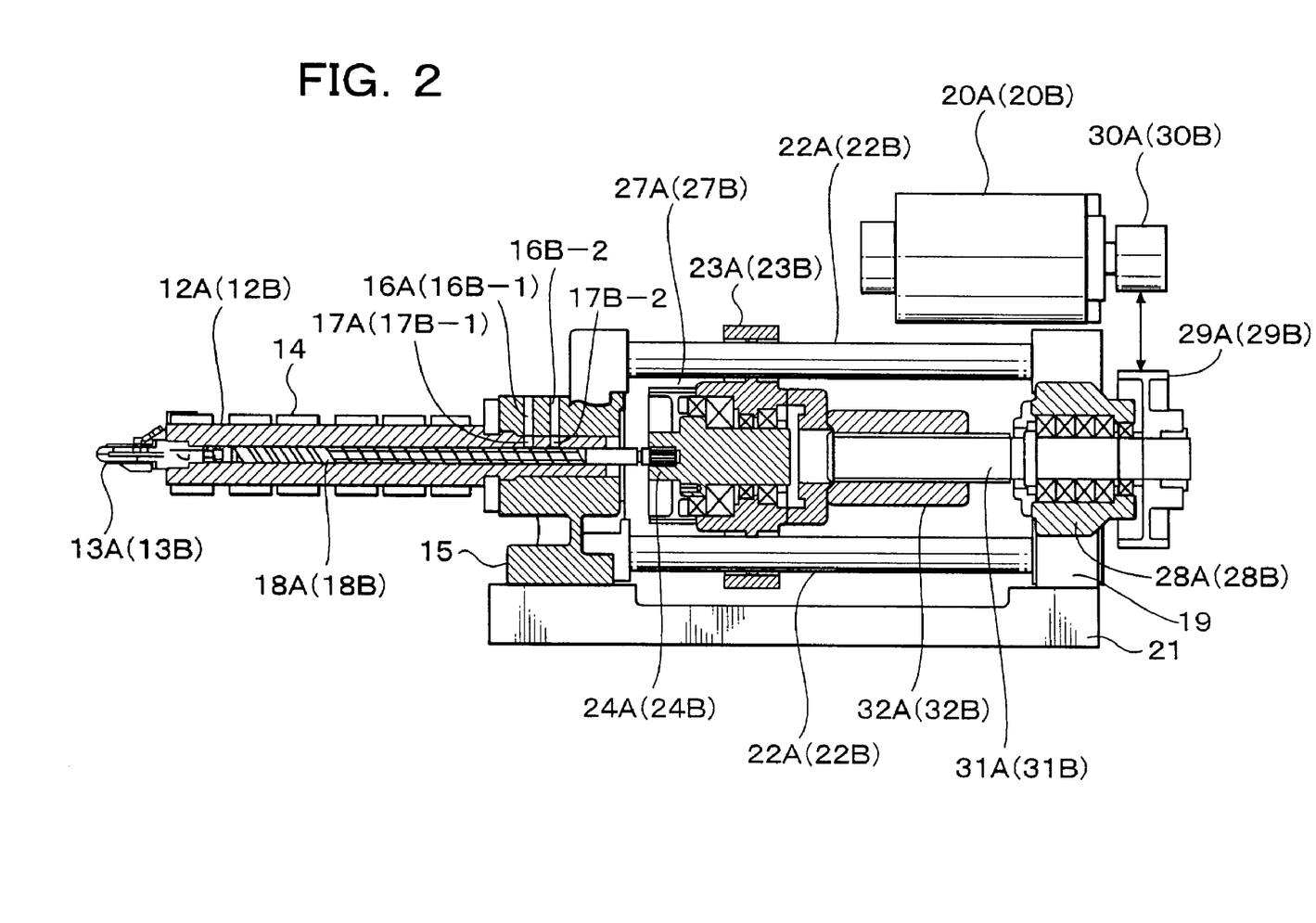
FIG. 2 is a sectional front view of the injection mechanism system of the injection molding machine according to the embodiment of the present invention.
Figure 3:
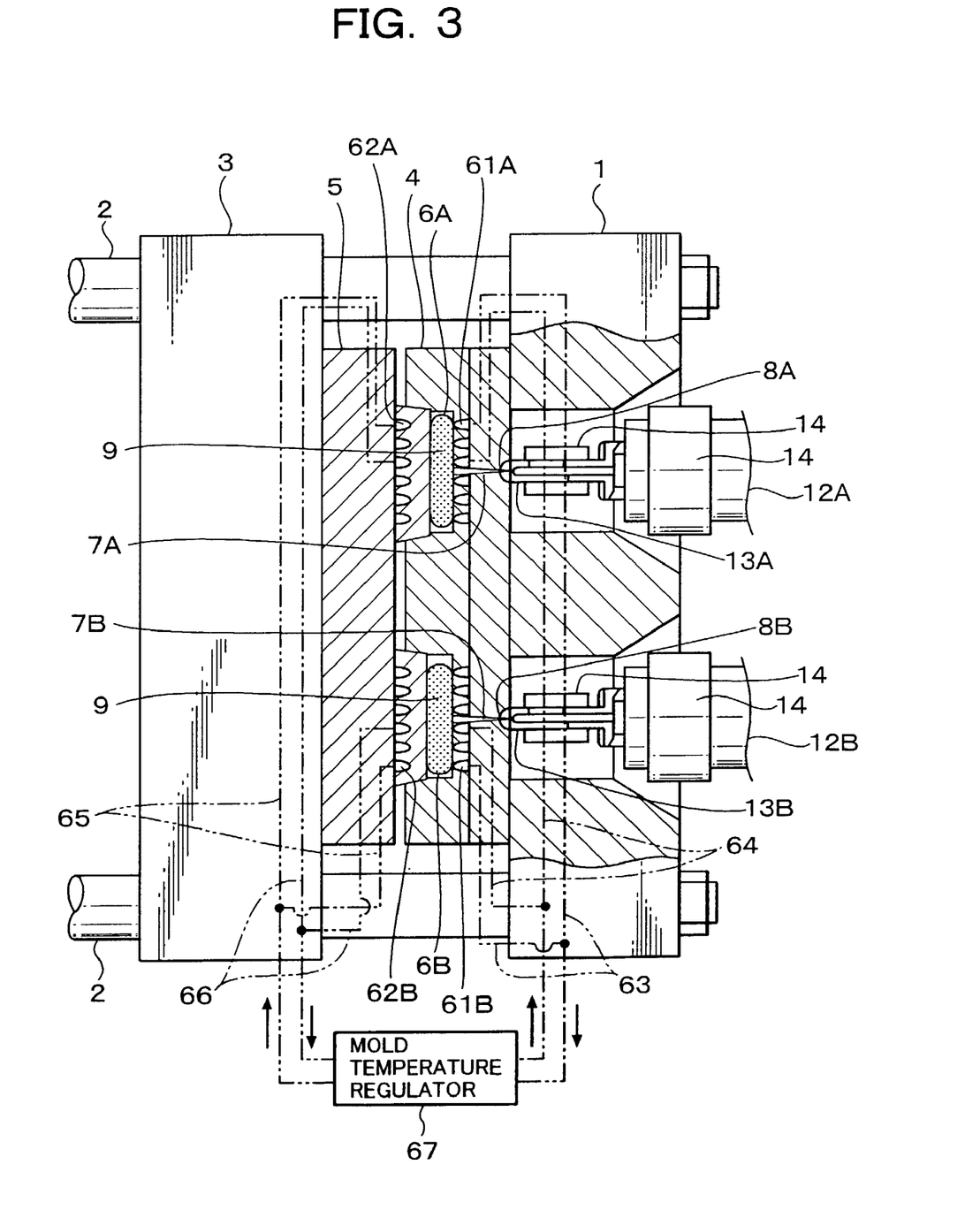
FIG. 3 is a main portion sectional plan view of the injection molding machine according to the embodiment of the present invention.

FIG. 1 is a main portion plan view showing chiefly an injection mechanism system of an injection molding machine according to an embodiment of the present invention; FIG. 2 is a sectional front view of the injection mechanism system of the injection molding machine according to the embodiment of the present invention; and FIG. 3 is a main portion sectional plan view of the injection molding machine according to the embodiment of the present invention. Incidentally, although a nozzle at the forward end of a heating cylinder of the injection mechanism system is illustrated to be separated from a fixed mold of a mold opening/closing mechanism system in FIG. 1, the nozzle at the forward end of the heating cylinder of the injection mechanism system is pressed onto a resin inlet of the fixed mold of the mold opening/closing mechanism system at the time of molding operation as shown in FIG. 3. In addition, in FIGS. 1 and 2, a part of the configuration is not shown.

In FIGS. 1 to 3, the reference numeral 1 represents a fixed die plate; 2, a tie bar laid between the fixed die plate 1 and a not-shown mold opening/closing drive source support plate; 3, a movable die plate into which the tie bar 2 is inserted so that the movable die plate 3 is guided by the tie bar 2 and which is driven to move forward/backward by the force of the not-shown mold opening/closing drive source; 4, a fixed mold attached to the fixed die plate 1; 5, a movable mold attached to the movable die plate 3; 6A and 6B, cavities which are spaces independent of each other for forming disk substrates and which are formed by the movable mold 5 and the fixed mold 4 at the time of mold closing; 7A and 7B, sprues formed correspondingly to the cavities 6A and 6B respectively so as to have short paths for introducing resin (molten resin) 9 into the cavities 6A and 6B respectively and independently; and 8A and 8B (see FIG. 3), resin inlet independent of each other for introducing the resin 9 into the sprues 7A and 7B respectively.

In addition, though left out in FIG. 1, the reference numeral 61A in FIG. 3 represents spiral pipe arrangement provided on the cavity 6A side of the fixed mold 4; 61B, spiral pipe arrangement provided on the cavity 6B side of the fixed mold 4; 62A, spiral pipe arrangement provided on the cavity 6A side of the movable mold 5; 62B, spiral pipe arrangement provided on the cavity 6B side of the movable mold 5; 63, pipe arrangement for making one end of each spiral pipe arrangement 61A, 61B of the fixed mold 4 communicate with a mold temperature regulator 67; 64, pipe arrangement for making the other end of each spiral pipe arrangement 61A, 61B of the fixed mold 4 communicate with the mold temperature regulator 67; 65, pipe arrangement for making one end of each spiral pipe arrangement 62A, 62B of the movable mold 5 communicate with the mold temperature regulator 67; 66, pipe arrangement for making the other end of each spiral pipe arrangement 62A, 62B of the movable mold 5 communicate with the mold temperature regulator 67; 67, a mold temperature regulator provided in common to the cavities 6A and 6B and for making control to keep the temperature of temperature controlling fluid flowing in each pipe arrangement to take a predetermined value, while controlling the outflow/inflow of the temperature controlling fluid.

In addition, the reference numerals 11A and 11B (see FIG. 1) represent in-line screw type plasticizing/injecting units independent of each other. The plasticizing/injecting units 11A and 11B are provided horizontally in parallel with each other. The reference numerals 12A and 12B represent heating cylinders of the plasticizing/injecting units 11A and 11B respectively. Nozzles 13A and 13B attached to the forward ends of the heating cylinders 12A and 12B respectively are pressed onto the corresponding resin inlets 8A and 8B respectively. Incidentally, band heaters 14 are wound around the heating cylinders 12A and 12B and the nozzles 13A and 13B.

The reference numeral 15 represents a retainer board for retaining the base end portions of the respective heating cylinders 12A and 12B. In the retainer board 15, resin supply holes 16A and 16B-1 are provided to supply a resin material from a hopper into the heating cylinders 12A and 12B, and a resin supply hole 16B-2 is provided to supply a resin material (recycled resin) from a scrap recovery/supply unit into the heating cylinder 12B. The resin supply holes 16A, 16B-1 and 16B-2 communicate with resin supply holes 17A, 17B-1 and 17B-2 (see FIG. 2) provided on the base end side of the heating cylinders 12A and 12B, respectively.

Figure 4:
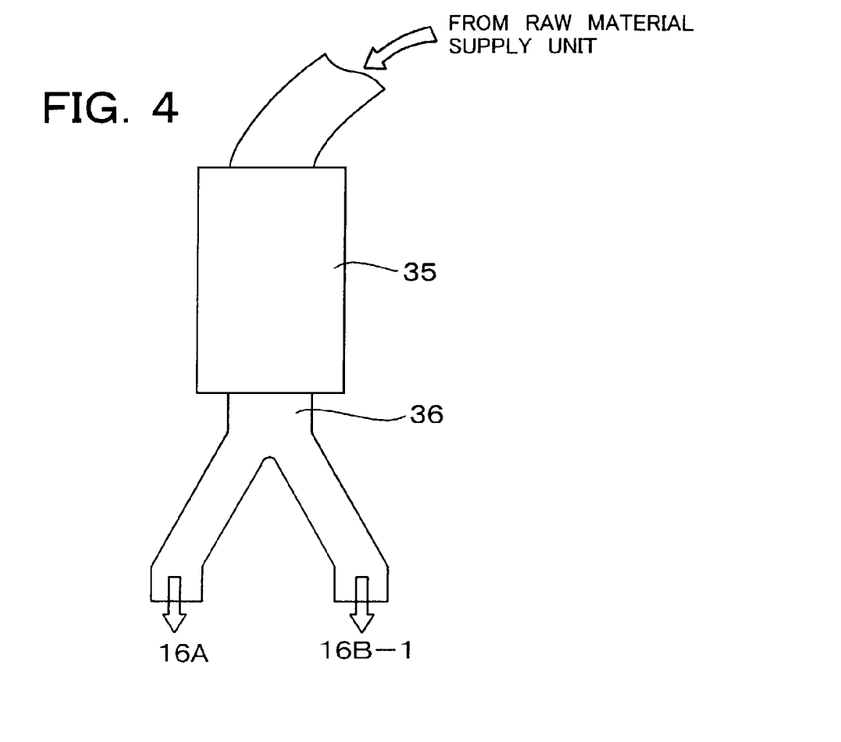
FIG. 4 is an explanatory view showing an example of a mechanism for supplying a resin material in the injection molding machine according to the embodiment of the present invention.

Here, the injection molding machine according to this embodiment is a machine for pairing two disk substrates molded simultaneously in the two cavities 6A and 6B and putting the disk substrates into a line for manufacturing laminated optical disks, as will be described later. Then, to mold disk substrates for a laminated optical disk of a double-sided type (in which two disks are used as optical disks individually), raw material resin (de novo raw material resin) is fed from a not-shown raw material supply unit to a single hopper 35, and the thus-fed de novo raw material resin of one and the same lot is then supplied from the hopper 35 to the resin supply holes 16A and 16B-1 (that is, into the heating cylinders 12A and 12B) through branching pipe arrangement 36 as shown in FIG. 4.

Figure 5:
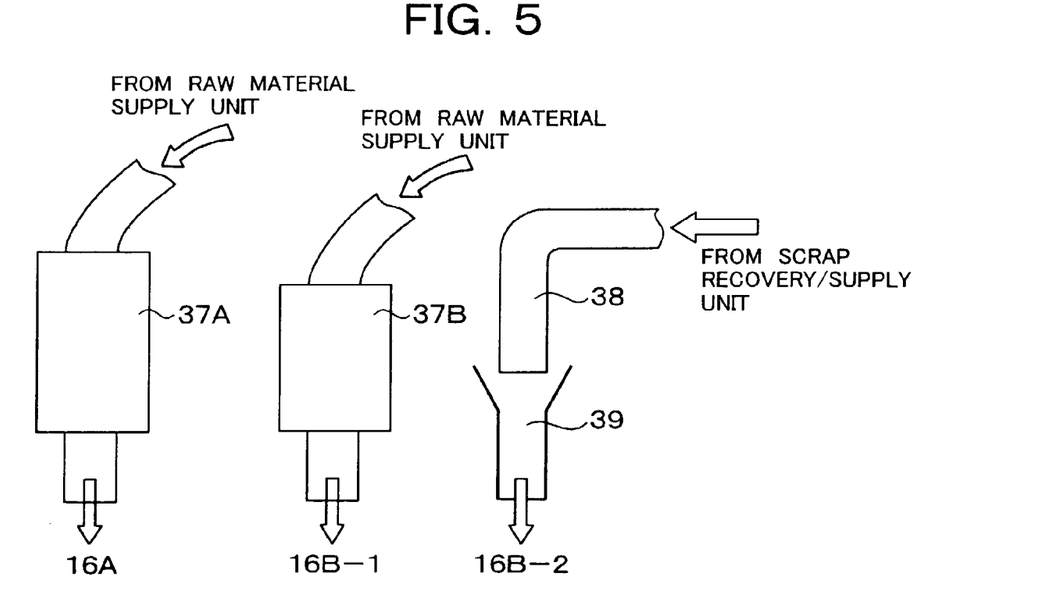
FIG. 5 is an explanatory view showing another example of a mechanism for supplying a resin material in the injection molding machine according to the embodiment of the present invention.

On the other hand, to mold disk substrates for a laminated optical disk of a single-sided type (in which only one disk is used as an optical disk and the other is used as a dummy disk), as shown in FIG. 5, (1) raw material resin (de novo raw material resin) is fed from a not-shown raw material supply unit to a first hopper 37A and the thus-fed de novo raw material resin is then supplied from the hopper 37A to the resin supply hole 16A (that is, into the heating cylinder 12A) through a supply portion of this hopper, while recycled resin obtained by grinding recycled resin (of the same material as that used for the optical disk) into pellets is fed from a not-shown raw material supply unit to a second hopper 37B and the thus-fed recycled resin is then supplied from the second hopper 37B to the resin supply hole 16B-1 (that is, into the heating cylinder 12B) through a supply portion of this hopper. Alternatively, (2) raw material resin (de novo raw material resin) is fed from a not-shown raw material supply unit to a first hopper 37A and the thus-fed de novo raw material resin is then supplied from the hopper 37A to the resin supply hole 16A (that is, into the heating cylinder 12A) through a supply portion of this hopper, while raw material resin (de novo raw material resin) is fed from a not-shown raw material supply unit to a second hopper 37B, the thus-fed de novo raw material resin is then supplied from the hopper 37B to the resin supply hole 16B-1 (that is, into the heating cylinder 12B) through a supply portion of this hopper, and recycled resin which has not been ground is supplied from a not-shown scrap recovery/supply unit (for recovering unnecessary resin portions, which may be produced at the time of mold release or ejection, from sprue portions and the like, and conveying the recovered resin portions by the air) to the resin supply hole 16B-2 (located on the upstream side of the resin supply hole 16B-1 in the direction in which the resin is fed) (incidentally, in this case (2), the de novo raw material resin may be supplied to the resin supply holes 16A and 16B-1 by the raw material supply mechanism shown in FIG. 4). That is, to mold disk substrates for a laminated optical disk of a single-sided type, recycled resin is used as at least a part of the material of the dummy substrate. Thus, resource saving is attained.

In addition, as shown in FIG. 2, screws 18A and 18B are built in the heating cylinders 12A and 12B respectively so that the screws 18A and 18B can rotate and move forward/backward. By the rotation of each screw, the resin material supplied to the rear side of the screw is kneaded, plasticized and then fed to the front side of the screw. As the molten resin stays on the front side of the screw, the screw retracts while the back pressure thereof is controlled. As soon as one shot of the molten resin is accumulated, the rotation of the screw is stopped. A measuring stroke is carried out in such an operation. In addition, when the screw located in the retraction position is driven to move forward suddenly, the accumulated molten resin is injected and charged from the nozzle into the fixed mold. Thus, an injection stroke (primary injection stroke) is carried out.

The reference numeral 19 represents a retainer board mounted with injection motors 20A and 20B (see FIG. 2) made of servo motors as injection drive sources (screw forward/backward drive sources) in the plasticizing/injecting units 11A and 11B respectively. The retainer board 19 is fixedly provided on a base board 21 together with the retainer board 15 so as to face the retainer board 15 at a predetermined distance. Two pairs of upper and lower guide bars 22A, 22A, 22B and 22B (see FIG. 2) for the plasticizing/injecting units 11A and 11B are laid between the retainer board 15 and the retainer board 19. A linearly movable piece 23A of the plasticizing/injecting unit 11A is slidably inserted into the guide bars 22A and 22A, while a linearly movable piece 23B of the plasticizing/injecting unit 11B is slidably inserted into the guide bars 22B and 22B. Rotors 24A and 24B (see FIG. 2) are rotatably retained by the linearly movable pieces 23A and 23B respectively. The base end portions of the screws 18A and 18B are fixed to the corresponding rotors 24A and 24B respectively.

The reference numerals 25A and 25B (see FIG. 1) represent measuring motors made of servo motors as measuring drive sources (screw rotation drive sources) of the plasticizing/injecting units 11A and 11B respectively. The measuring motors 25A and 25B are mounted on the corresponding linearly movable pieces 23A and 23B so as to be conveyed together with the linearly movable pieces, respectively. The reference numerals 26A and 26B represents driving pulleys fixed to the output shafts of the measuring motors 25A and 25B respectively. The driving pulleys 26A and 26B are coupled with driven pulleys 27A and 27B through timing belts respectively. The driven pulleys 27A and 27B are fixed to the rotors 24A and 24B respectively. Then, by the rotation of the measuring motor 25A, the rotor 24A is driven to rotate through the driving pulley 26A, the timing belt and the driven pulley 27A. Thus, the screw 18A is rotated. On the other hand, by the rotation of the measuring motor 25B, the rotor 24B is driven to rotate through the driving pulley 26B, the timing belt and the driven pulley 27B. Thus, the screw 18B is rotated.

Shaft retainers 28A and 28B for rotatably retaining screw shafts 31A and 31B of ball screw mechanisms for transmitting the rotational force of the injection motors 20A and 20B are attached to the retainer board 19 respectively. The screw shafts 31A and 31B of the ball screw mechanisms are rotatably retained by the shaft retainers 28A and 28B respectively. Driving pulleys 30A and 30B fixed to the output shafts of the injection motors 20A and 20B respectively are coupled with driven pulleys 29A and 29B through timing belts respectively. The driven pulleys 29A and 29B rotate together with the screw shafts 31A and 31B respectively. In addition, nut pieces 32A and 32B of the ball screw mechanisms are screwed down to the screw shafts 31A and 31B respectively. The end portions of the nut pieces 32A and 32B are fixed to the linearly movable pieces 23A and 23B respectively. Then, by the rotation of the injection motor 20A, the screw shaft 31A is driven to rotate through the driving pulley 30A, the timing belt and the driven pulley 29A. This rotational motion is converted into linear motion and transmitted to the linearly movable piece 23A through the nut piece 32A. Thus, the screw 18A is driven to move forward/backward. On the other hand, by the rotation of the injection motor 20B, the screw shaft 31B is driven to rotate through the driving pulley 30B, the timing belt and the driven pulley 29B. This rotational motion is converted into linear motion and transmitted to the linearly movable piece 23B through the nut piece 32B. Thus, the screw 18B is driven to move forward/backward.

Figure 6:
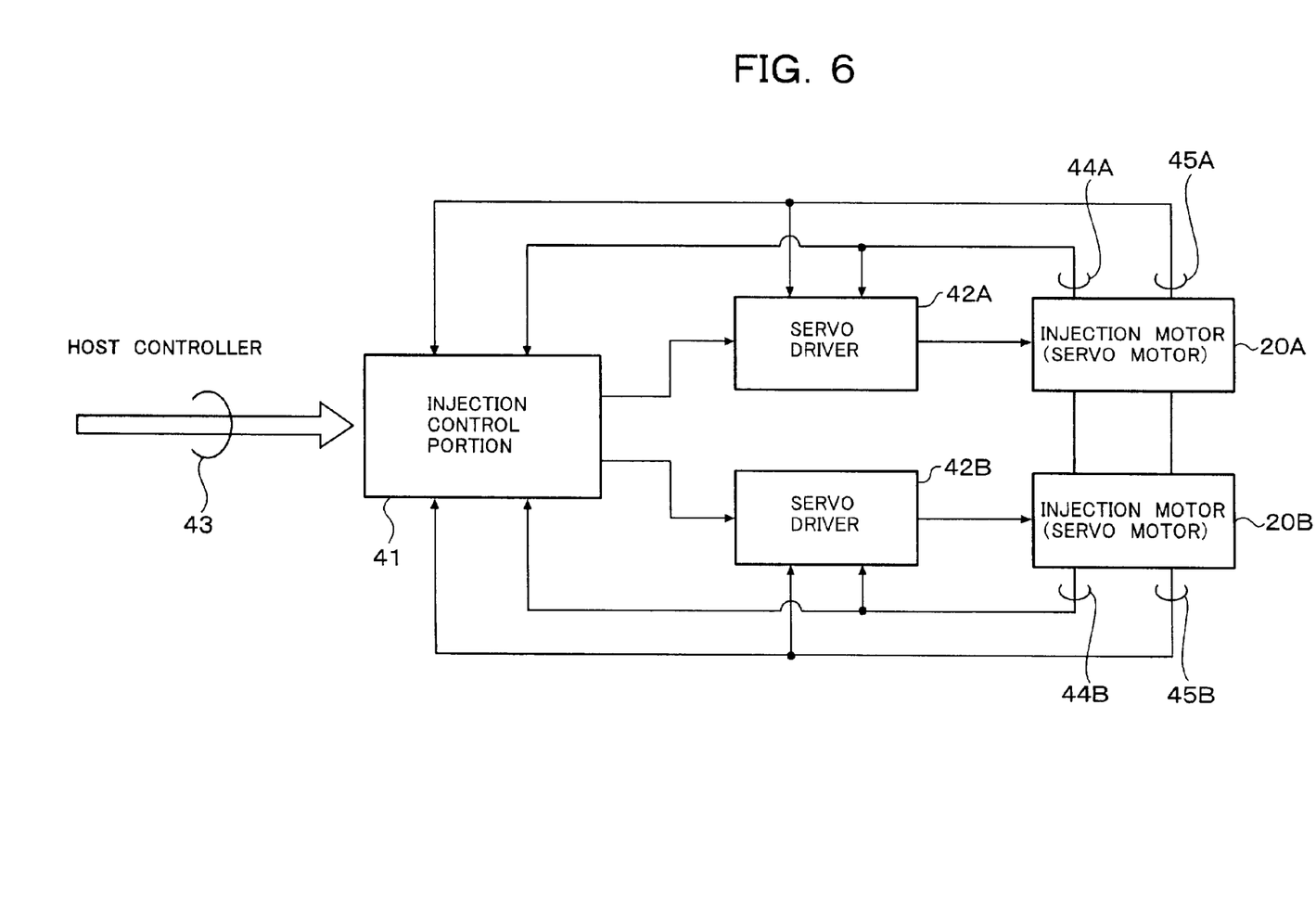
FIG. 6 is a block diagram showing the configuration of an injection control system of the injection molding machine according to the embodiment of the present invention.

FIG. 6 is a block diagram showing the configuration of an injection control system in the injection molding machine according to this embodiment. In FIG. 6, the reference numeral 41 represents an injection control portion; 42A, a servo driver for feedback control of the injection motor 20A; and 42B, a servo driver for feedback control of the injection motor 20B.

The injection control portion 41 controls the injection operation in accordance with a control signal 43 from a not-shown host controller for administering the control of the machine (injection molding machine) as a whole. When the injection control portion 41 acknowledges, through the control signal 43, that it is the injection start timing, the injection control portion 41 begins to drive the injection motors 20A and 20B synchronously through the servo drivers 42A and 42B on the basis of injection control condition data provided in advance.

The servo driver 42A acknowledges the current position (measured position), the current velocity (measured velocity) and the current pressure (measured pressure) of the screw 18A through measured position data 44A from an encoder provided in the injection motor 20A, and measured pressure data 45A based on a real driving current value of the injection motor 20A. In the velocity feedback control domain, the injection motor 20A is driven and controlled by PID feedback control so that the measured velocity coincides with a set velocity value provided by the injection control portion 41. In the pressure feedback control domain, the injection motor 20A is driven and controlled by PID feedback control so that the measured pressure coincides with a set pressure value provided by the injection control portion 41. Similarly, the servo driver 42B acknowledges the current position (measured position), the current velocity (measured velocity) and the current pressure (measured pressure) of the screw 18B through measured position data 44B from an encoder provided in the injection motor 20B, and measured pressure data 45B based on a real driving current value of the injection motor 20B. In the velocity feedback control domain, the injection motor 20B is driven and controlled by PID feedback control so that the measured velocity coincides with a set velocity value provided by the injection control portion 41. In the pressure feedback control domain, the injection motor 20B is driven and controlled by PID feedback control so that the measured pressure coincides with a set pressure value provided by the injection control portion 41.

Description will be made on the injection operation of this embodiment configured thus. In this embodiment, the temperature control conditions (temperature control conditions based on PID feedback control) are set to be totally the same between the first resin flow path system (resin flow path system on the cavity 6A side) and the second resin flow path system (resin flow path system on the cavity 6B side) in the mold. In addition, the temperature control conditions (temperature control conditions based on PID feedback control) are set to be totally the same between the plasticizing/injecting unit 11A and the plasticizing/injecting unit 11B. That is, the temperature control conditions are set to be the same between the first resin flow path system and the second resin flow path system regardless of whether there is an unavoidable slight mechanism difference in manufacturing between the both or not, and the temperature control conditions are set to be the same between the plasticizing/injecting unit 11A and the plasticizing/injecting unit 11B regardless of whether there is an unavoidable slight mechanism difference in manufacturing between the both or not. Incidentally, not to say, a temperature control portion is formed on one and the same board so as to be shared in the machine as a whole.

Then, when it is the injection start timing, the injection control portion 41 first gives the servo drivers 42A and 42B an instruction to carry out injection by velocity feedback control. As a result, the servo drivers 42A and 42B begin to drive the injection motors 20A and 20B synchronously so that the measured velocities thereof coincide with velocity instruction values respectively. Thus, the screws 18A and 18B begins to move forward synchronously. As a result, the resin 9 is injected and charged into the cavity 6A by the screw 18A while the resin 9 is injected and charged into the cavity 6B by the screw 18B. In addition, when a predetermined amount of the resin 9 is injected and charged into the cavities 6A and 6B respectively, the injection control portion 41 gives the servo drivers 42A and 42B an instruction to perform compression by pressure feedback control. The servo drivers 42A and 42B controls the injection motors 20A and 20B so that the measured pressures thereof coincide with pressure instruction values respectively. Thus, compressive force is imparted to the resin 9 in the cavities 6A and 6B by the screws 18A and 18B respectively.

Here, when there is no unavoidable slight mechanism difference in manufacturing between the first resin flow path system and the second resin flow path system, and there is no unavoidable slight mechanism difference in manufacturing between the plasticizing/injecting unit 11A and the plasticizing/injecting unit 11B, the velocity control conditions or the pressure control conditions are set to be totally the same between the servo drivers 42A and 42B. Typically, however, there is an unavoidable slight mechanism difference in manufacturing between the first resin flow path system and the second resin flow path system, and there is also an unavoidable slight mechanism difference in manufacturing between the plasticizing/injecting unit 11A and the plasticizing/injecting unit 11B. Therefore, a slight difference is provided between the velocity control conditions for the servo driver 42A and the velocity control conditions for the servo driver 42B so that the charged states in the two cavities 6A and 6B become uniform therebetween. In addition, in accordance with necessity, a slight difference is provided between the pressure control conditions for the servo driver 42A and the pressure control conditions for the servo driver 42B in a similar manner so that the compression states in the two cavities 6A and 6B become uniform therebetween. Thus, the weight of a disk substrate obtained in the cavity 6A and the weight of a disk substrate obtained in the cavity 6B can be made as equal to each other as possible. That is, the control with a slight difference in the velocity/pressure control conditions of the injection motors (servo motors) becomes fine and excellent in reproducibility in comparison with the related-art control with a slight difference in temperature control conditions between the first resin flow path system and the second flow path system. It is therefore possible to make the two disk substrates molded simultaneously more uniform in weight.

Incidentally, the slight difference in velocity control conditions or pressure control conditions between the two injection motors is obtained as follows. That is, control condition changes and trial shots are repeated to find out optimum conditions in accordance with a machine error peculiar to each machine in advance. The optimum conditions obtained thus are reflected on the control conditions of the two injection motors (servo motors) respectively. Thus, the control conditions are set.

Here, in this embodiment, rotary servo motors are used as the injection motors, and the rotational force thereof is converted into linear motion so as to drive the screws linearly. However, linear servo motors may be used as the injection motors so as to drive the screws linearly by the linear drive force of the linear servo motors.

Figure 7:
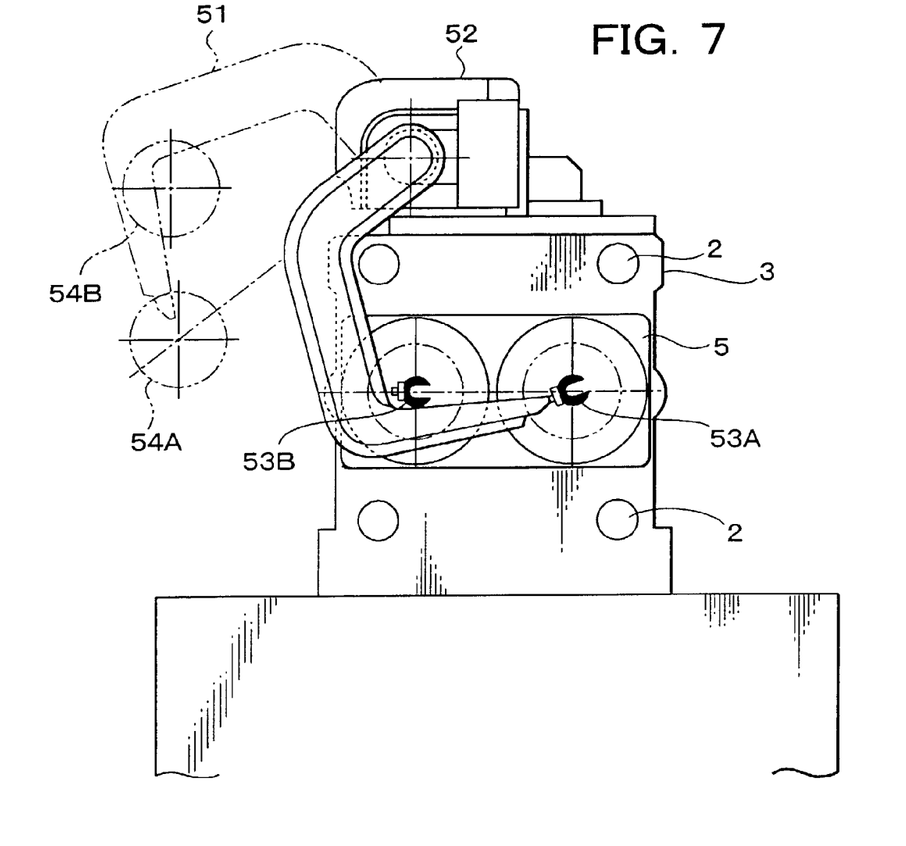
FIG. 7 is an explanatory view showing an example of the configuration of an unloader for use in the injection molding machine according to the embodiment of the present invention.

FIG. 7 is a view showing the configuration of an unloader for use in the injection molding machine according to this embodiment. In FIG. 7, the reference numeral 51 represents a whirling arm; 52, a whirling drive source made of a motor or an air cylinder; 53A and 53B, chucking portions provided at the forward end of the whirling arm 51; and 54A and 54B, disk substrates.

As shown in FIG. 7, the unloader is mounted on the movable die plate 3. The whirling arm 51 takes a waiting position as shown by the two-dot chain line in FIG. 7 except when disk substrates are unloaded. Then, at the time of mold opening carried out after the completion of injection/charging and cooling, the whirling arm 51 whirls to the position shown by the solid line in FIG. 7. Then, for example, the chucking portions 53A and 53B use means such as vacuum chuck to receive the two disk substrates 54A and 54B ejected by ejection operation (an ejection mechanism is left out in FIGS. 1 to 3). The two disk substrates 54A and 54B received are put on a belt conveyor or the like in a manufacturing line through a not-shown suitable delivery unit in accordance with necessity.

Figure 8:
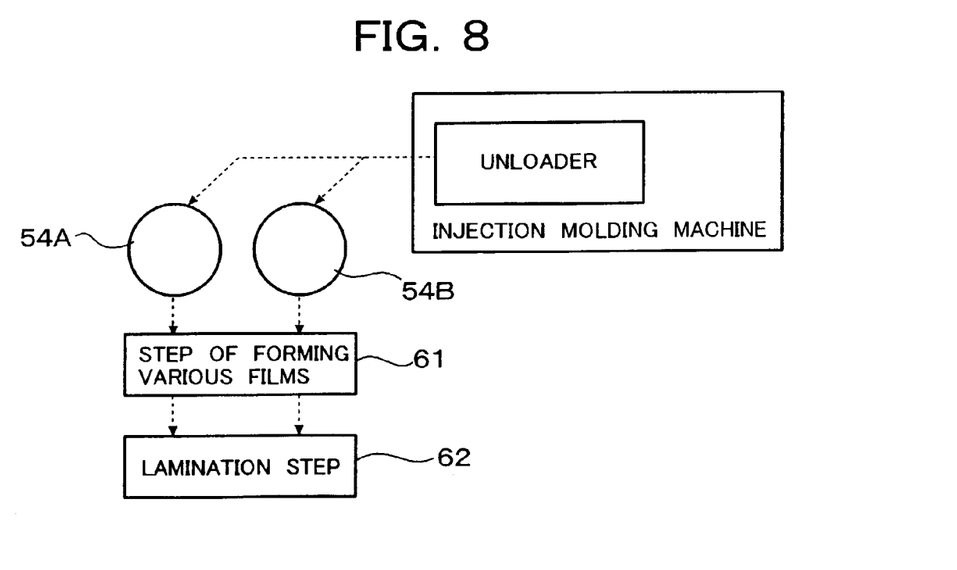
FIG. 8 is an explanatory view schematically showing a line for manufacturing laminated optical disks of a double-sided type, to which line the injection molding machine according to the embodiment of the present invention is applied.

FIG. 8 is a diagram schematically showing the manufacturing line of laminated optical disks (here, laminated optical disks of a double-sided type), to which the injection molding machine according to this embodiment has been applied. The two disk substrates 54A and 54B molded by the injection molding machine and unloaded by the unloader are filmed with reflective films, protective films, and the like, in a step 61 of forming various films. In a lamination step 62, a bonding agent is applied to a lamination surface of one of the disks in a method such as spin coating, and the two disks are then bonded and fixed to each other. Thus, a laminated optical disk is completed. Incidentally, when a laminated optical disk of a single-sided type is manufactured, not to say, a reflective film, a protective film and the like are formed on only the disk substrate 54A on the layer 0 side.

Figure 9A:
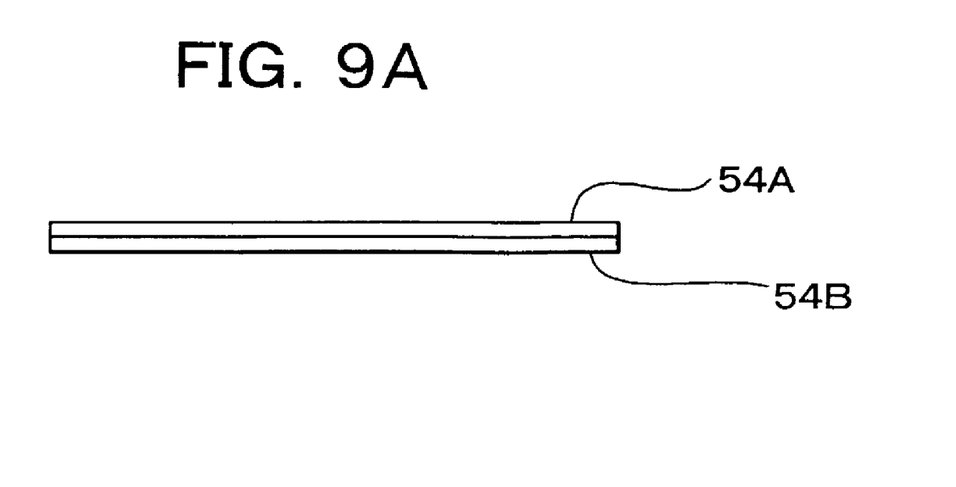
FIGS. 9A to 9C are explanatory views showing the states where two disks are laminated, respectively.
Figure 9B:
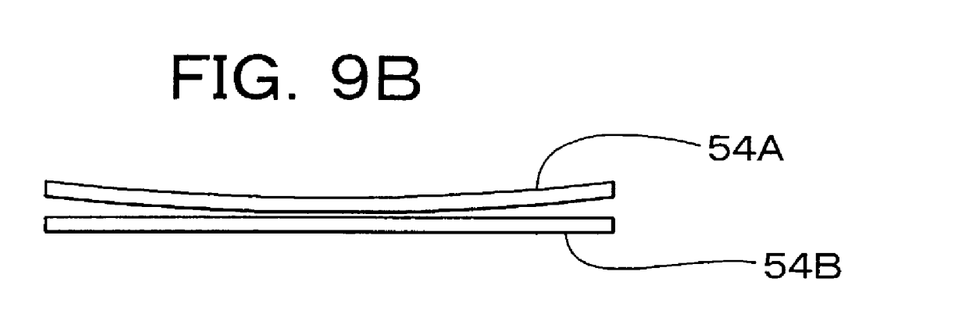
Figure 9C:
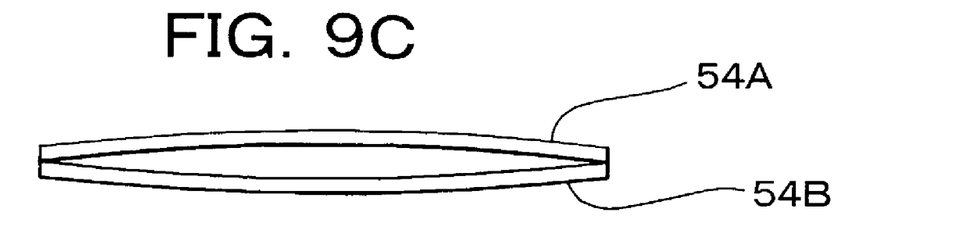

Incidentally, when the two disks are bonded and fixed to each other, the two disks (disk substrates 54A and 54B) are typically bonded in the condition that both the disks are completely flat as shown in FIG. 9A. However, some optical disk manufacturers may make a request to warp one of the disks as shown in FIG. 9B or to warp both the disks in different directions as shown in FIG. 9C, in accordance with the specifications or properties of laminators or know-how for lamination (the warps in FIGS. 9B and 9C are exaggerated, but real warps are minute). In the injection molding machine according to this embodiment, the plasticizing/injecting units 11A and 11B are independent of each other. Accordingly, by controlling the servo controls of the plasticizing/injecting units 11A and 11B independently of each other, it is possible to satisfy the dimensional requests shown in FIGS. 9B and 9C easily. Incidentally, the warp is closely related to the substrate thickness. When only one substrate is warped as shown in FIG. 9B, there occurs a slight difference (about several μm) in substrate thickness between the two disk substrates 54A and 54B within a range allowed by the specification. In this case, priority is given to the warping. Thus, slight unbalance in weight between the two disk substrates is allowed.

As has been described above, according to the present invention, in an injection molding machine using a two-disk forming mold, two disk substrates molded simultaneously can be made uniform without unbalance in weight. In addition, the two disk substrates molded simultaneously are paired and put into a laminated optical disk manufacturing line, so that the start-up efficiency of molding operation is improved greatly in comparison with the case where one disk substrate is molded at each shot by each of two injection molding machines and the disk substrates obtained thus are put into the laminated optical disk manufacturing line. Thus, there is an advantage that it is possible to avoid waste of disk substrates. In addition, in a laminated optical disk of a single-sided type, recycled resin can be used for at least a part of a dummy disk. Thus, resource saving can be attained. Further, the degree of warp can be intentionally made different between disk substrates to be paired, in accordance with a request from a lamination step.

What is claimed is:

1. An injection molding machine comprising:
a two-disk forming mold including two disk molding cavities independent of each other, and resin inlets provided correspondingly to said cavities respectively;
two plasticizing/injecting units independent of each other, said plasticizing/injecting units using servo motors as injection drive sources;
a common temperature control system for equalizing temperature control conditions of two resin flow path systems to said cavities in said mold, said temperature control system including a fluid circulating path having a partial path shared by the two resin flow paths, such that a fluid whose temperature is controlled by the temperature control system which is to be circulated to said two resin flow paths is shared by said two resin paths;

an injection controller, said injection controller controlling said servo motors through respective servo drivers; and a host controller, said host controller programmed to control said injection controller to set velocity control conditions and pressure control conditions of said two plasticizing/injecting units individually to equalize or substantially equalize charged conditions in said two cavities, taking into account differences in manufacturing of said two resin flow path systems, wherein said temperature control system is arranged to circulate said temperature-controlled fluid to equalize temperature control conditions of said resin flow paths during operation of said host controller, injection controller, servo drivers and servo motors to control operations of said two plasticizing/injecting units so as to equalize or substantially equalize charged states of said two cavities, further comprising:

an unloader, said unloader arranged to simultaneously unload two disk substrates molded simultaneously by said two cavities and place said disk substrates into a laminated optical disk manufacturing line.

2. An injection molding machine according to claim 1: wherein de novo raw material resin of one and the same lot is branched and supplied into said two plasticizing/injecting units simultaneously.

3. An injection molding machine according to claim 1: wherein recycled resin alone or together with de novo raw material resin is supplied to one of said two plasticizing/injecting units.

* * * * *